Jan. 9, 1968        A. BOUDOURIS        3,362,543
LOCKING ARRANGEMENT FOR FOOD TRAYS
Filed Oct. 22, 1965        2 Sheets-Sheet 1
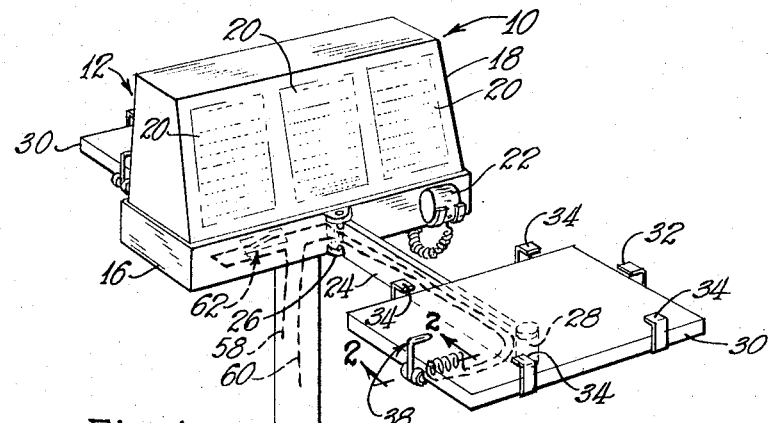
INVENTOR.
ANGELO BOUDOURIS
BY
*Owen & Owen*
ATTORNEYS INVENTOR.
ANGELO BOUDOURIS
BY
Owen & Owen
ATTORNEYS

United States Patent Office 3,362,543
Patented Jan. 9, 1968

3,362,543
LOCKING ARRANGEMENT FOR FOOD TRAYS
Angelo Boudouris, Sylvania, Ohio, assignor to Eprad Incorporated, Toledo, Ohio, a corporation of Ohio
Filed Oct. 22, 1965, Ser. No. 501,046
5 Claims. (Cl. 211—133)

ABSTRACT OF THE DISCLOSURE

A system for locking a food tray on a food tray support as used in drive-in restaurants is provided. The locking arrangement system includes an electrically energized solenoid which cooperates with a retainer which is supported by the food tray support, at least when the food tray is supported thereon, and prevents removal of the tray from the support. The solenoid is remotely operated by a switch located in the main part of the menu stand with the switch preferably being magnetically operated. With this arrangement, a waitress can operate the switch through a magnet carried on her person when it is desired to remove a tray from the support.

---

This invention relates to a locking arrangement for preventing removal of food trays from food tray supports at drive-in restaurants or the like.

Drive-in restaurants now are commonly equipped with menu stands located between two parking spaces. The stands each include a post for supporting the stand on the ground, a housing on the post carrying a menu, and a pair of arms extending from the housing with tray supports mounted on the ends of the arms. The arms commonly are pivoted to the tray support and to the housing and often additionally have pivotable joints therebetween.

With menu stands of this type, the food trays simply rest on top of the tray supports and can be readily placed thereon and removed therefrom. The food trays are of conventional design and do not have the complicated hook and bracket arrangements previously used in drive-in restaurants when the trays were hooked on a window of the car door. Consequently, the trays have many household uses, the same as any conventional tray. As a result, it is not uncommon for a drive-in restaurant to lose a large number of trays over the course of a year, the loss often amounting to several hundred dollars or more.

The present invention provides a locking arrangement by means of which a food tray can be locked on a food tray support to prevent the substantial losses heretofore incurred. Further, the locking arrangement is unobvious with the result that most customers are not even aware of the fact the food tray cannot be removed. In accordance with the invention, the tray support has electrically-operated means, as in the form of a solenoid, which provides a positive locking arrangement to prevent removal of a tray from the support, except when desired. An electrical circuit connected with the solenoid has a switch remotely located from the food tray support for energizing the solenoid. The remote switch preferably is magnetically-responsive and can be, in a specific form, a magnetic reed switch carried in the menu stand and closed when a magnet carried by a waitress is moved to a position near the switch.

It is, therefore, a principal object of the invention to provide an electrically-operated tray lock with a remote switch for releasing the tray.

Another object of the invention is to provide an electrically-operated tray lock with a remotely located magnetically-responsive switch for energizing and releasing the electrically-operated lock.

Other objects and advantages of hte invention will be apparent from the folowing detailed description of a preferred embodiment thereof, reference being made to the accompanying drawing, in which:

FIG. 1 is a somewhat schematic view in perspective of a menu stand, including food tray supports, of a type commonly found in drive-in restaurants;

FIG. 2 is an enlarged, fragmentary view in cross section taken along the line 2—2 of FIG. 1;

FIG. 3 is a cross-sectional view similar to FIG. 2 with a retainer shown in a second position;

FIG. 4 is a diagrammatic view of an electrical circuit used to operate the food tray retainer;

Figure 5:
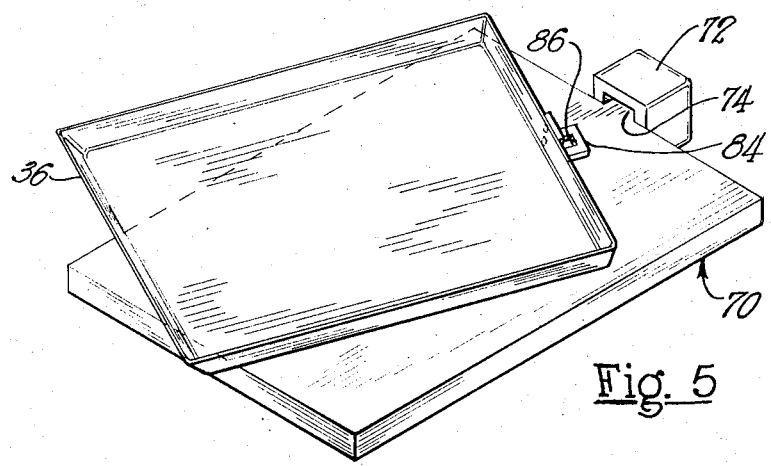
FIG. 5 is a view in perspective of a modified tray support embodying the invention.

Referring to FIG. 1, a menu stand embodying the invention is indicated at 10 and includes a housing 12 and a supporting post 14. The housing 12 has a base 16 affixed to the post 14 and a canopy 18 carrying a bill-of-fare or menu indicated by rectangles 20 on each side thereof. A suitable light source (not shown) can be located within the housing 12 to light the bill-of-fare on the translucent rectangles 20 and a speaker 22 can be mounted on the base 16 or in any other suitable position to enable two-way communication between the customer at the menu stand and an order-taker in the building where the food is prepared. A supporting arm 24 extends from each side of the base 16 and can be suitably pivoted to the base by a knuckle 26. The arm also can be pivotally connected by a knuckle 28 to a respective tray support 30 located at the outer end. The arms need not be pivotally connected to the base or the support; on the other hand, they can have additional pivoted joints to provide greater flexibility for the arms.

In the specific form shown, the tray support 30 has an end tray retainer 32 at the rear edge and additional retainers 34 at the side edges of the support. As shown, the retainers can be bolted to the support 30 or can be integrally cast therewith, by way of example. The retainers extend partly over the edge of a food tray 36 when placed on the support 30 to prevent the tray from being removed therefrom in all but one direction.

A pivotable tray retainer 38 is located at the front or fourth edge of the tray support 30 and includes a leg 40 extending over the top of the tray 36, when the retainer is in an upper position, and a vertical leg 42 affixed to a shaft or axle 44 rotatably mounted in ears 46 located at the lower front edge of the tray support.

A housing 48 located below the support 30 contains an electrical coil 50 having a core or locking means 52 which can protrude toward the front edge of the tray support 30 and, when extended, project into a recess or notch 54 in the axle 44. The core is urged outwardly by a spring 56 when the coil 48 is not energized so as to automatically project into the recess 54 when aligned therewith. In that position, the axle 44 cannot be rotated and the retainer 38 is held in the upper position to prevent removal of the tray 36. When the coil 50 is energized, however, it draws the core into the coil free of the axle so that the retainer 38 can be either swung to its lower position or pivotally swung downwardly under the force of gravity. The tray 36 can then be removed by a waitress, at will.

The coil 50 can be connected to the same source of power as the light in the menu stand and the speaker 22. Accordingly, conductors or lines 58 and 60 extend from the coil 50 back through or along the arm 24 and into the base 16. These lines can extend downwardly through the post 14, for example, and back through underground conduits to a source of power in the drivein headquarters. In series with the coil 50 and in the line 58 is a magnetically-actuated reed switch 62 which is commerically available. The switch includes a pair of reeds 64 and 66 mounted at opposite ends in a housing 68. When the reeds 64 and 66 are subjected to a magnetic field of predetermined magnitude, they are moved together to complete a circuit from the power source through the coil 50 and thereby energize the solenoid and retract the core 52. The magnetic reed switch 62 is mounted within the housing 12 and preferably on a side wall of the base 16 or on the side wall of the canopy 18. In this position, when a magnet is moved to a position adjacent the housing and near the reed switch, the switch will be actuated to energize the coil.

In operation, assuming the retainer 38 is in the lower position as shown in FIG. 3, when a waitress brings an order on the tray 36, she slides it onto the support 30 with the edges under the retainers 32 and 34. She then moves the retainer 38 up to the upper position with the leg 40 over the edge of the tray, at which time the spring 56 moves the core 52 into the recess 54. The retainer 38 then cannot be moved until the core 52 is subsequently withdrawn. This is done when the food is consumed and the tray is to be removed by the waitress placing the magnet against the housing 12 in the vicinity of the reed switch 62, causing the switch to close and the coil 50 to be energized. The coil then withdraws the core 52 so that the retainer 38 can again swing to its lower position, manually or by gravity. The tray 36 can then be removed from the support 30 with the support ready to receive another tray since the retainer 38 remains in its lower position. The magnet can be carried on the wrist of the waitress by a suitable band or can be attached to a chain or carried in a pocket, for example.

Figure 6:
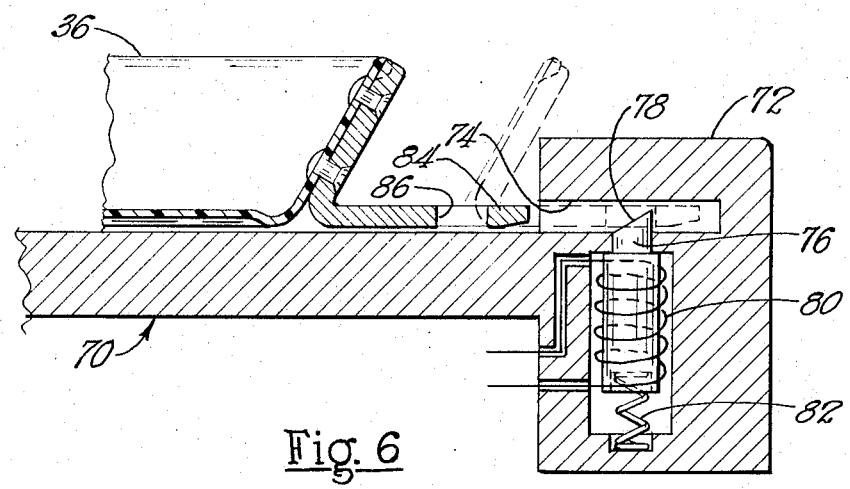
FIG. 6 is a fragmentary, enlarged view in vertical cross section of part of the locking means of FIG. 5.

A slightly modified locking arrangement for the food tray is shown in FIGS. 5 and 6. A modified tray support 70 is mounted on the same arm 24 but does not require the retainers 32 and 34. In place of the retainer 38, the tray support 70 has a small housing 72 at the rear edge thereof forming a recess or passage 74 into which locking means or a core 76 extends transversely. The core 76, which has a slanted upper end 78, is associated with an electrical coil 80 and is drawn into the coil when the core is energized. A spring 82 at the lower end of the coil 80 urges the core 76 upwardly to the upper position, as shown in FIG. 6. When the coil is energized, however, the tip of the slanted end 78 is withdrawn below the lower surface of the passage 74. The coil 80 is energized through a remotely-located switch in the same manner as the coil 50.

In this instance, a locking tab or retainer 84 is affixed, as by riveting or any other suitable means, to a central portion of an end of the tray 36 and is supported indirectly by the tray support 70 when the tray is resting thereon. The tab 84 has an opening 86 or recess into which the locking core 76 extends when the tab 84 is inserted in the passage 74 and the opening 86 is aligned with the core 76. The tab 84 can be inserted in the passage 74 even when the coil 80 is not energized because of the camming effect of the slanted end 78 of the core. The tab 84, when inserted, will move the core downwardly to overcome the force of the spring 82, after which the core will snap up again when aligned with the opening 86. In this position, the tray cannot be removed until the coil 80 is energized and the core 76 is fully retracted.

In operation, the locking arrangement of FIGS. 5 and 6 functions in the same manner as the locking arrangement of FIGS. 1–4. The arrangement of FIGS. 5 and 6 enables a simpler tray support to be employed without the various retainers. On the other hand, the tray of FIGS. 5 and 6 requires the retainer 84 which requires installation on the tray and may occasionally get in the way during the handling thereof.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. Apparatus for supporting a food tray and preventing undesirable removal of the tray, said apparatus comprising a tray support, a solenoid coil carried by said support and having a core spring means for moving the core to one position when the coil is de-energized, and said coil urging the core to a second position when energized, retaining means comprising a tab affixed to said tray, said retaining means having a recess receiving said core when said tray is in a predetermined position on said support and said core is in one of said positions to prevent removal of the tray from said support, said core having a slanted end which is capable of being contacted and depressed by said retaining means by overcoming the force of said spring means when the tray is positioned on said tray support, switch means carried by said stand and connected to a source of power, and circuit means connecting said switch means and said coil to energize said coil by said power source when said switch means is closed.

2. Apparatus for supporting a food tray and preventing undesirable removal of the tray, said apparatus comprising a stand including a post for supporting said stand on the ground, said stand carrying a menu and defining an enclosed space, an arm extending from said stand, a tray support mounted on said arm, a solenoid coil carried by said support and having a core, means for moving the core to one position when the coil is de-energized, and said coil urging the core to a second position when energized, retaining means supported by said tray, said retaining means having a recess receiving said core when in one of said positions and said retaining means having a portion spaced from said recess engageable with said tray to prevent removal of the tray from said support when said core is received in said recess, magnetically-operated switch means carried by said stand and connected to a source of power, and circuit means connecting said switch means and said coil to energize said coil by said power source when said switch means is closed whereby said core is moved to said second position.

3. Apparatus for supporting a food tray and preventing undesirable removal of the tray, said apparatus comprising a tray support having retaining means on three sides to extend over a food tray when placed thereon to prevent removal of the food tray from any of the three sides, a retainer having a shaft, means pivotally supporting said shaft at the fourth side of said food tray support to prevent removal of the tray from the fourth side when said retainer is in an upper position and enabling removal of the tray from the fourth side when said retainer is in a lower position, a solenoid supported by said tray support and having a core engageable with said shaft to hold said retainer in the upper position when said coil is de-energized, said core being free of said shaft when said coil is energized to enable said retainer to be swung to its lower position, a remotely-located magnetically-operated reed switch connected to a source of power, and circuit means connecting said reed switch and said coil, said coil being energized by said power source when said reed switch is closed.

4. Apparatus for supporting a food tray and preventing undesirable removal of the tray, said apparatus comprising a stand, an arm extending from said stand, a tray support mounted on said arm and having retaining means on three sides to extend over a food tray when placed thereon to prevent removal of the food tray from any of the three sides, a retainer having a shaft, means pivotally supporting said shaft at the fourth side of said food tray support to prevent removal of the tray from the fourth side when said retainer is in an upper position and enabling removal of the tray from the fourth side when said retainer is in a lower position, a solenoid supported by said tray support and having a core engageable with said shaft to hold said retainer in the upper position when said coil is de-energized, said sore being free of said shaft when said coil is energized to enable said retainer to be moved to its lower position, a magnetically-operated reed switch in the interior of said stand and connected to a source of power, circuit means connecting said reed switch and said coil, said coil being energized by said power source when said reed switch is closed.

5. Apparatus for supporting a food tray and preventing undesirable removal of the tray, said apparatus comprising a stand including a post for supporting said stand on the ground, said stand carrying a menu and defining an enclosed space, an arm extending from said stand, a tray support mounted on said arm and having retaining means on three sides to extend over a food tray when placed thereon to prevent removal of the food tray from any of the three sides, a retainer having a shaft, means pivotally supporting said shaft at the fourth side of said food tray support to prevent removal of the tray from the fourth side when said retainer is in an upper position and enabling removal of the tray from the fourth side when said retainer is in a lower position, a solenoid supported by said tray support and having a core engageable with said shaft to hold said retainer in the upper position when said coil is de-energized, said core being free of said shaft when said coil is energized to enable said retainer to be swung to its lower position, a magnetically-operated reed switch in the interior of said stand and connected to a source of power, circuit means connecting said reed switch and said coil, said coil being energized by said power source when said reed switch is closed, and a magnet adapted to be carried by a waitress for closing said reed switch when said magnet is placed against said stand.

References Cited

UNITED STATES PATENTS

| | | | |
|---|---|---|---|
| 1,804,069 | 5/1931 | Stover | 211—133 |
| 2,689,279 | 9/1954 | Noregaard | 335—136 |
| 2,696,528 | 12/1954 | Chesick | 179—160 |
| 3,031,086 | 4/1962 | Blair | 211—133 |
| 3,266,278 | 8/1966 | Ennitt | 70—277 |
| 3,289,443 | 12/1966 | Norman | 70—276 |

ROY D. FRAZIER, *Primary Examiner.*

CHANCELLOR E. HARRIS, *Examiner.*

W. D. LOULAN, *Assistant Examiner.*